Dec. 12, 1950     G THORNTON-NORRIS     2,533,638
INSTRUMENT FOR INDICATING THE OPERATING
TIME OF VEHICLES AND OTHER DEVICES
Filed Aug. 18, 1947
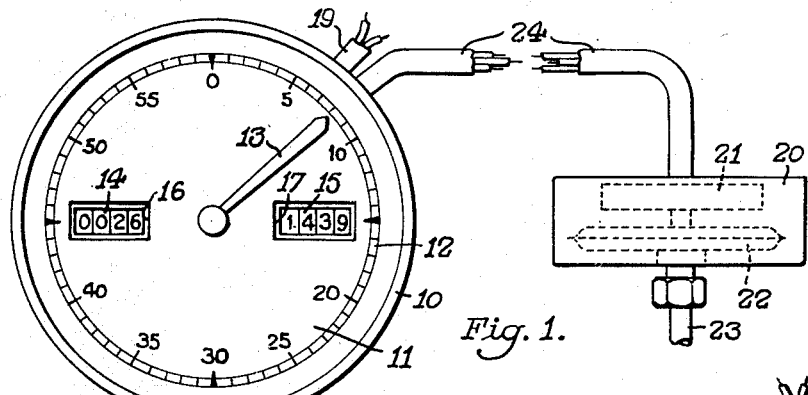
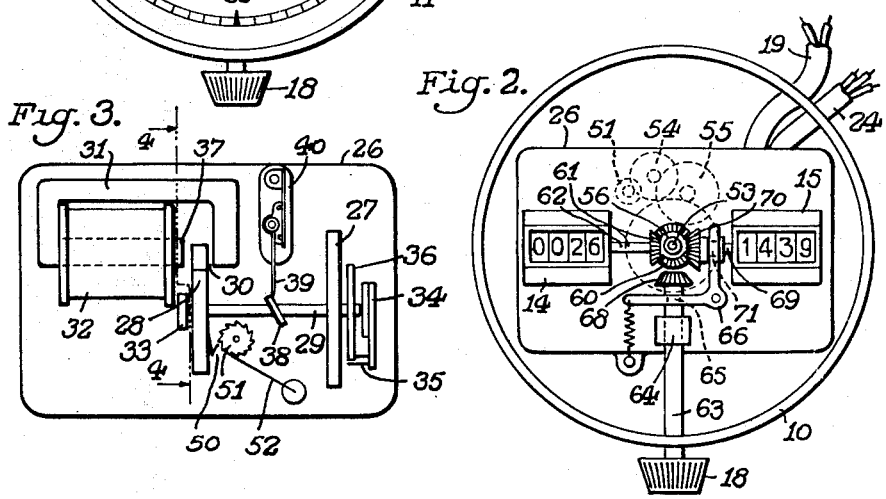
INVENTOR
GEORGE THORNTON-NORRIS,
BY Reynolds & Beach
ATTORNEYS Patented Dec. 12, 1950

2,533,638

UNITED STATES PATENT OFFICE 2,533,638

INSTRUMENT FOR INDICATING THE OPERATING TIME OF VEHICLES AND OTHER DEVICES

George Thornton-Norris, London, England

Application August 18, 1947, Serial No. 769,112
In Great Britain August 30, 1946

13 Claims. (Cl. 161—15)

This invention relates to instruments for indicating the operating time of vehicles and other devices. Such indication is particularly desirable upon an airplane, since the engine, for example, is due for servicing of one kind or another, or for replacement, after operation for a total number of hours, such as 100 hours, or 1000 hours. The airplane may be piloted by many different individuals during that time, and while each is required to enter his flying time in the log book, often such entries are quite inaccurate, and in the aggregate depart, by an appreciable percentage, from the actual operating time. Since one purpose of logging the time is to insure periodical servicing, for safety's sake, the inaccuracy of logging may precipitate dangerous conditions. Likewise, servicing of other aircraft components, as the hydraulic systems, is often done on a time basis, and in similar fashion servicing of automobile engines or automobiles generally, is desirable on a time-and-mileage basis. In all such situations it is desirable that the time be logged automatically, without attention by the operator, and indicated clearly at all times.

It is an object of the invention to provide a time integrating and indicating instrument which is driven by electricity and is so arranged that it starts reliably whenever the current supply is connected at the commencement of an integrating period, namely at the instant when the vehicle or equivalent starts to operate. In this specification each period when the instrument is integrating the operating time of the vehicle or equivalent is termed "an operating period."

According to the invention an instrument for indicating the operating time of a vehicle or other device comprises time-indicating means, an oscillatory chronometric balance which drives the time-indicating means, electrical means for maintaining the balance in oscillation, a main switch which is closed during the operating period for rendering the maintaining means operative; and a starting device for setting the balance in oscillation as said control switch is closed.

There is further provided according to the invention an instrument for indicating the operating time of a vehicle or other device, comprising time-indicating means, an oscillatory chronometric balance which drives the time-indicating means, an electromagnet for maintaining the balance in oscillation, a contact-maker operated by the balance to energise the electromagnet at every oscillation of the balance, the contact-maker being open when the balance in inoperative, a main switch which is closed during the operating period for rendering the maintaining means operative, and a starting device comprising an auxiliary switch which is connected across the contact-maker, said auxiliary switch being closed temporarily to energise the electromagnet and cause the balance to be attracted away from its position of rest, thus initiating oscillation.

Conveniently the starting device is brought into action at the end of the operating period for checking the balance, and thus bringing it rapidly to a standstill. The control switch for the maintaining means preferably includes auxiliary contacting means which are closed temporarily during the closing of said control switch, and if desired during the opening thereof, so as to bring the starting means into action.

The integrating means conveniently comprises one, two or more indicators of the cyclometer type having sets of discs or drums numbered from 0 to 9 and arranged to be driven so as to show a direct indication of the number of units of time, say hours, during which the vehicle or equivalent has been operating. If desired one or more of such indicators may be provided with re-setting means by which they can be readily returned to zero. The indicating means may also include one or more angularly movable hands adapted to be read in conjunction with a dial, say to show times shorter than one unit, e. g. minutes.

The invention is illustrated by way of example in the accompanying diagrammatic drawings, in which—

Figure 1 is a front elevation of the preferred form of instrument for aircraft, together with the remote fluid-actuated switch;

Figure 2 is a front elevation of the indicating instrument with the front glass, dial-plate and hand removed;

Figure 3 is a rear elevation of the chronometric balance movement shown in Figure 2;

Figure 4 is a sectional elevation taken on the line 4—4 of Figure 3;

Figure 5 is a diagram of the contact-maker as shown in Figure 3 but drawn to a considerably enlarged scale;

Figure 6 is a circuit diagram where a resistance is used as loading means; and

Figure 7 is an alternative circuit diagram including a tapped electromagnet coil.

The instrument shown in Figures 1 and 2 is primarily intended to be installed on the instrument-board of an aircraft to give an accurate indication of the time during which the aircraft has been in operation, i. e. the sum of the operating periods. It comprises a casing 10 fitted with a circular dial-plate 11 divided circumferentially at 12 into sixty divisions representing minutes. A radial hand 13 indicates the minutes, and of course moves angularly at the rate of one revolution per hour during the operating periods. To show the number of complete hours two counters 14 and 15 of the well-known cyclometer type are mounted within the casing 10 so as to be visible through rectangular openings 16 and 17 in the dial-plate 11. A resetting knob 18 at the bottom of the casing 10 is pushed upwards and turned to zeroize the "trip" counter 14, said knob 18 at the same time turning the hand 13 so that the latter can be left in its upwardly-pointing zero position. The instrument is operated from a battery or other source of electrical energy (not shown) connected to a twin conductor 19 but its action is controlled remotely by a switch unit 20 arranged to be installed at the most convenient position on the aircraft. This unit incorporates a switch which is indicated generally at 21, and a fluid-pressure capsule 22, which latter is connected by a pipe 23 to a suitable pressure (or vacuum) system which comes into operation when the aircraft is flying; thus the pipe 23 can be connected to the pitot head of the usual air-speed indicator, or to the pressure lubricating system of the engine where the actual engine running time is required to be indicated. A triple conductor 24 is used to connect the unit 20 with the instrument itself.

Internally the instrument comprises an electrically driven clock movement 26 of the known form having a chronometric balance wheel 27 (see Figure 3) which is maintained in oscillation by a bar-like iron armature 28 carried by the balance staff 29, said armature swinging through the gap 30 of a G-shaped iron core 31 intermittently energised by an electric coil 32. As mentioned above this form of movement is already known for use in ordinary clocks but its action will be described herein as it is essential for a clear understanding of the present invention. The balance staff 29 is mounted in bearings 33 and 34, the latter incorporating the usual regulating pins 35 engaging the spiral balance spring 36; in its static condition the armature 28, which moves as one with the balance wheel 27 is disposed in the inclined position shown in Figure 4 with respect to the pole 37 of the electromagnet 31. The supply of current to the coil 32 when the clock movement is running is controlled by a contact-maker device comprising a small thin contact plate 38 which is secured to the balance staff 29 to oscillate therewith and co-operates with a contact pin 39 mounted upon a platform 40 which is electrically insulated from the main parts of the movement, including the balance staff 29. The arrangement of the contact-maker is shown more clearly in Figure 5. The contact pin 39 is fast upon a triangular plate 41 which is mounted rotatably on a fixed pivot 42, thus holding the pin 39 in the vertical plane of the axis of the staff 29 but allowing it to swing in said plane. The pin 39 is resiliently centered by a light cantilever spring 43 which is anchored to the platform 40 at 44 and presses against two spaced pegs 45 and 46 upstanding from the plate. The contact plate 38 is somewhat D-shaped or eccentric and its outwardly projecting part is arranged obliquely as shown diagrammatically in Figure 5; on its back it is covered with electrical insulating material 47. In the static position of the balance staff 29 (shown in Figure 4) the plate 38 is out of engagement with the pin 39.

As the armature rotates anti-clockwise, as viewed in Figure 4, the part 48 of the plate 38 leads, so that the plate 38 itself engages the contact pin 39, making contact therewith and deflecting it towards the right (as viewed in Figure 5) until the projecting part of the plate 38 passes beyond the pin 39, thus allowing the latter to return to its central position. It will be seen that the electrical contact is made between the pin 39 and plate 38 (and the electromagnet 31 energised) as the armature moves towards the pole-piece 37, but it is broken just before that position is reached, so de-energising the electromagnet and permitting the armature 28 and balance wheel 27 to make their full forward swing. During the return swing the part 49 of the plate 38 leads, so that the pin 39 is deflected leftwards and merely slides along the insulation 47, the electromagnet remaining dead. The armature 28 is fitted with a spring pawl 50 (Figure 3) which drives a small ratchet wheel 51, a spring detent 52 being provided. As shown in Figure 2, the ratchet wheel 51 drives a central spindle 53 by a reduction gear train 54, 55. The hand 13 is mounted on a sleeve 56 fitted on said spindle and arranged to engage it resiliently, forming a frictional drive which enables the hand 13 to be reset without turning the gear train 54, 55.

The resetting mechanism shown in Figure 2 comprises a bevel gear wheel 60 which is fast upon the sleeve 56 and permanently drives a bevel gear wheel 61 upon the spindle 62 of the "trip" counter 14. This counter is of the type in which reverse rotation of the driving spindle rapidly turns back the indicator wheels until each has reached its zero position. For effecting this operation, the knob 18 is mounted on a spindle 63 which is rotatable and axially slidable in a bearing 64. The spindle 63 is circumferentially grooved at 65 to engage the horizontal arm of a bell-crank lever 66, which arm is normally drawn downwards by a spring 67. A bevel gear wheel 68 upon the upper end of the spindle 63 is thus held out of engagement with the bevel wheel 60, although it can be brought into engagement and the instrument reset, by raising the knob 18 and then turning it so that the hand 13 moves backwards; after the "trip" counter 14 has reached zero, the movement is continued, as necessary, to bring the hand 13 to its vertical zero position. In order to preserve the indication of total hours on the counter 15, the spindle 69 is slidably fitted with a bevel gear wheel 70, the collar of which is circumferentially grooved at 71 for engagement by the vertical arm of the bell-crank lever 66, so that, as the bevel gear wheel 68 moves into mesh with the central gear wheel 60, the bevel gear wheel 70 moves out of mesh therewith. The spindle 69 is of square or other non-circular shape so as to allow the bevel gear wheel 70 to slide axially and retain its driving engagement with said spindle 69. After resetting, the spring 67 moves the bell-crank lever to bring the gear wheel 70 back into mesh with the central gear wheel 60.

A typical arrangement of the switch 21 and the electrical connections is shown in Figure 6. The switch comprises three mutually insulated contact fingers, namely a central finger 75 which is relatively stiff, and two outer fingers 76, 77 which are resilient. They are mounted upon an anchorage 78 and the upper finger 76 has two contacts 79 and 80 adapted to engage respectively with a contact 81 on the finger 75 to form an auxiliary switch, and a contact 82 on the finger 77 to form a main switch. The finger 76 tends to press the contact 79 firmly against the contact 81, so that the auxiliary switch 79, 81 is normally closed; the finger 77 is actuated by the capsule 22 and normally springs away from the finger 76 so that the contacts 80, 82 forming the main switches are separated. When pressure fluid is supplied to the capsule 22 the finger 77 is moved upwards and first closes the main switch by bringing the contact 82 into engagement with the contact 80. As the upward force of the capsule 22 increases, the finger 76 becomes lifted by the contact 82 and causes disengagement of the contacts 79, 81; there is however an appreciable time during which both contacts 81 and 82 are in engagement with the finger 76, due mainly to the springy nature of the fingers 76 and 77.

The electromagnet coil 32 is connected in series with loading means comprising a resistance 83, and this is connected to the contact pin 39. The contact plate 38 is connected (by way of the staff 29, balance spring 30 and body of the clock movement 26) to the finger 76. The finger 77 is connected with a master switch 84, which is conveniently incorporated with the main engine switch of the aircraft, the circuit being fed with current from a battery indicated at 85. A wire 86 leads from the middle finger 75 to the junction of the coil 32 with the resistance 83. As above mentioned, when the clock movement is static the contact pin 39 is disengaged from the contact plate 38, so that assuming the master switch 84 is closed the mere engagement of the contact 82 with the contact 80 will not complete the circuit, and therefore the clock would not start unless the balance were to be set into oscillation by some means. This result is attained automatically in this device by the middle contact finger 75. Thus as pressure fluid enters the capsule 22 and causes the lower finger 77 to rise, contact is first made at 80, 82 while contacts 79, 81 are still engaged, so that current can flow through the coil 32 and the wire 86, through contacts 81, 79, thence along finger 76 to contacts 80, 82 and back to the battery 85. This causes the electromagnet 31 to be energised, so that the armature 28 is attracted and moved sufficiently to bring the contact-maker 38, 39 into action, therefore a current of very short duration passing through the wire 86 is all that is necessary to start the clock movement; the operating current for said movement is of course fed through the contacts 80, 82 and circuit-maker 38, 39 so long as the master switch 84 is closed and the capsule 22 is expanded by pressure fluid. In order to produce energetic and reliable starting the coil 32 is designed to run normally in series with the loading resistance 83, which latter is by-passed by the wire 86 during the initial impulse, thus causing the first momentary current through the coil 32 to be substantially greater than the normal operating current. If desired a similar result may be obtained by using the arrangement shown in Figure 7 where the resistance 83 is omitted and the wire 86 is taken to a tapping in the coil 32; thus when only part of the coil 32 is in action during the initial starting impulse the circuit impedance is reduced, with the result that a much heavier current flows and produces a stronger energisation of the electromagnet 31. The by-passed portion 32a of the coil constitutes the loading means in this case, serving to reduce the operating current to its normal value.

It will be noted that when the pressure in the capsule 22 falls at the end of each operating period, the auxiliary switch 79, 81 closes a short time before the main switch 80, 82 opens, thus causing the wire 86 to by-pass the contact-maker 38, 39. This provides a momentary strong energisation of the electromagnet 31 which draws the armature 28 to its central position, with the result that the oscillation of the balance system is completely or largely damped out to bring the movement rapidly to a standstill, and avoid driving the ratchet wheel 51 after the operating period has terminated.

It will be understood that the arrangements described above are given only by way of example and that various modifications may be made to suit requirements. Thus where the instrument is used to integrate and indicate the flying time of an aircraft the control switch can be operated by a pneumatic capsule or other variable volume device connected with the air-speed indicator, the variable volume device, if desired, being embodied in the same casing as the indicating means; alternatively the control switch may be actuated by the retraction and extension of the undercarriage which occurs when the aircraft is airborne, or by any other means which gives the necessary movements determining the beginning and the end of each operating period. Where the instrument is used for showing the running time of a vehicle or machine a centrifugal or other rotary device may be used to work the control switch, while suitable switch actuating means are usually easy to devise where the instrument is required for other purposes. Any supply of electricity can be used, alternating or direct, and in this connection the device is particularly adapted for aircraft and motor vehicle as the usual storage battery supply is most convenient and suitable. It will be apparent that where the instrument is used to show the operating time of engines, jet propulsion units and like mechanisms, the capsule can be connected with the lubricating oil or fuel oil system so as to bring the clock movement into action when the oil pressure exceeds a predetermined value.

The invention provides a simple form of instrument for indicating operating time in which the clock movement comes to rest in a position ensuring that the supply circuit is broken, this form of instrument being particularly desirable as the chance of accidental burning-out of the winding (and consequently the fire risk) is substantially eliminated. Nevertheless the instrument is started reliably and instantaneously wholly by electrical means, at the commencement of each operating period, without needing recourse to shaking or other mechanical devices for bringing the balance into action.

What I claim is:

1. An instrument for indicating the operating time of a vehicle or the like, comprising an electrically operated chronometric device, including an impulse generating switch normally open but closable periodically to repeatedly energize said chronometric device, an indicator driven by said chronometric device, a main switch in circuit with said impulse generating switch, starting means in shunt across said impulse generating switch intermediate the latter and said main switch, means shiftable between two positions, and operatively connected to the vehicle or the like to be automatically maintained in or shifted to one such position while the vehicle is stopped, and to be automatically shifted to and maintained in the other such position when the vehicle starts, said shiftable means being operatively connected to said main switch and said starting means to close the main switch upon starting of the vehicle, thereby to initiate energization of the chronometric device and effect initial closure of the impulse generating switch, by way of the starting means, said shiftable means shifting oppositely upon stopping of the vehicle, for reopening of the main switch.

2. An instrument as set forth in claim 1, wherein the starting means comprises an auxiliary switch, and wherein the shiftable means is operatively engageable with the auxiliary switch to automatically open the latter immediately after closure of the main switch and transmission of an initial starting impulse to the chronometric device, and for automatic reclosure of the auxiliary switch upon reopening of the main switch.

3. An instrument as set forth in claim 2, wherein the main switch is biased to open, and the auxiliary switch is biased to close, and including resilient means operatively interconnecting the shiftable means and said two switches to enable closure of the main switch in advance of opening of the auxiliary switch.

4. An instrument as in claim 3, wherein the resilient means is operatively organized and arranged to enable reclosure of the auxiliary switch in advance of reopening of the main switch, upon stopping of the vehicle and consequent shifting of the shiftable means.

5. An instrument as in claim 1, including an impedance in circuit with the main switch and the chronometric device, but by-passed by the shunt connection of the starting device.

6. An instrument as in claim 1, wherein the chronometric device includes a periodically oscillatable balance staff, and the impulse generating switch includes an eccentrically shaped contact plate carried by said staff and conductive at one face and insulated at its other face, and a contact finger fixedly disposed but resiliently mounted to engage first the conductive face and then the insulated face of said contact plate, as the staff oscillates.

7. An instrument as in claim 6, wherein the chronometric device includes an electromagnet in circuit with and energizable at each engagement of the plate's conductive face with the contact finger, and a bar armature, biased towards switch-open position, attracted by said electromagnet and carried by the staff.

8. An instrument as in claim 1, wherein the shiftable means comprises a pressure-sensitive device operatively connected to a pressure source which is operative only during operation of the vehicle or the like.

9. An engine operating time indicator comprising time indicating means, an oscillatory chronometric balance which drives the time indicating means, an electromagnet for maintaining the balance in operation, a contact maker which is operated by the balance so as to close once during each oscillation, the contact maker remaining open when the balance is at rest, a source of electric current connected to the electromagnet and the contact maker in series, a main switch controlling the flow of current from the source through the electromagnet, a pressure capsule connected to the engine and responsive to fluid pressure developed when the engine is running, and an auxiliary switch which is operated by the pressure capsule and is connected across the contact maker to short-circuit the latter, said auxiliary switch normally being closed but being opened by the capsule when pressure fluid is fed thereto by the running of the engine.

10. An engine operating time indicator comprising time indicating means, an oscillatory chronometric balance which drives the time indicating means, an electromagnet for maintaining the balance in operation, a contact maker which is operated by the balance so as to close once during each oscillation, the contact maker remaining open when the balance is at rest, a source of electric current connected to the electromagnet and the contact maker in series, a main switch in series with the contact maker, an auxiliary switch which is connected across the contact maker and is normally closed to short-circuit said contact maker, and a fluid-pressure actuated device arranged to open the auxiliary switch when fed with pressure fluid by the running of the engine.

11. An engine operating time indicator comprising time indicating means, an oscillatory chronometric balance which drives the time indicating means, an electromagnet for maintaining the balance in operation, a contact maker which is operated by the balance so as to close once during each oscillation, the contact maker remaining open when the balance is at rest, a source of electric current connected to the electromagnet and the contact maker in series, a pressure capsule connected to the engine and responsive to fluid pressure developed when the engine is running and a switch device comprising two relatively flexible blades extending alongside one another, a relatively rigid blade extending between said flexible blades, a normally open main switch constituted by cooperating contacts upon the two flexible blades, a normally closed auxiliary switch constituted by cooperating contacts upon one flexible blade and the rigid blade, the pressure capsule being connected to the other flexible blade so that when fluid pressure is fed to the capsule due to running of the engine, movement of said capsule first closes the main switch and then opens the auxiliary switch.

12. An engine operating time indicator according to claim 9, having current-reducing means connected in series with the contact maker, said current-reducing means and the contact maker both being short-circuited by the auxiliary switch when the latter is closed.

13. An engine operating time indicator according to claim 9, comprising a tapped electromagnet winding, the auxiliary switch being connected between the tapping thereof and that pole of the contact maker remote from the electromagnet.

GEORGE THORNTON-NORRIS.

REFERENCES CITED

The following references are of record in the file of this patent:

UNITED STATES PATENTS

| Number | Name | Date |
|---|---|---|
| 1,162,447 | Bristol | Nov. 30, 1915 |
| 1,557,721 | Passamaneck et al. | Oct. 20, 1925 |
| 2,008,338 | Rodanet | July 16, 1935 |
| 2,084,226 | Strahm | June 15, 1937 |
| 2,294,031 | Hobbs et al. | Aug. 25, 1942 |